United States Patent
Goble et al.

(10) Patent No.: US 10,902,251 B2
(45) Date of Patent: Jan. 26, 2021

(54) DIGITAL ASSESSMENT USER INTERFACE WITH EDITABLE RECOGNIZED TEXT OVERLAY

(71) Applicant: Pearson Education, Inc., Bloomington, MN (US)

(72) Inventors: Matthew Goble, Superior, CO (US); David Strong, Denver, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 74 days.

(21) Appl. No.: 16/410,967

(22) Filed: May 13, 2019

(65) Prior Publication Data

US 2020/0364448 A1   Nov. 19, 2020

(51) Int. Cl.
*G06K 9/00* (2006.01)
*G06T 11/60* (2006.01)
*G06N 20/00* (2019.01)
*G09B 7/02* (2006.01)

(52) U.S. Cl.
CPC ......... *G06K 9/00436* (2013.01); *G06N 20/00* (2019.01); *G06T 11/60* (2013.01); *G09B 7/02* (2013.01)

(58) Field of Classification Search
None
See application file for complete search history.

(56) References Cited

U.S. PATENT DOCUMENTS

| 10,169,347 B2* | 1/2019 | Jayachandran | G06F 16/116 |
| 2006/0262962 A1* | 11/2006 | Hull | G06K 9/228 |
| | | | 382/103 |
| 2017/0083172 A1* | 3/2017 | Schneider, IV | G06F 3/04847 |
| 2017/0358119 A1* | 12/2017 | Forutanpour | G06T 15/04 |
| 2019/0073564 A1* | 3/2019 | Saliou | G06N 3/084 |
| 2019/0244008 A1* | 8/2019 | Rivera | G06K 9/00671 |

* cited by examiner

*Primary Examiner* — Hadi Akhavannik
(74) *Attorney, Agent, or Firm* — Quarles and Brady LLP

(57) ABSTRACT

Systems and methods are provided by which information such as text may be extracted from a captured digital image, and displayed as an editable overlay over the captured digital image in a digital user interface. One or more boundaries defining a region or regions of the captured digital image from which information is extracted may be displayed over the captured digital image, and may be selectively added, edited, or deleted, resulting in corresponding information in the editable overlay being added, edited, or deleted. Additionally, information in the editable overlay may be added, edited, or deleted directly. The extracted information may correspond to responses to a homework assignment or test depicted in the captured digital image. The extracted information may be arranged in ordered steps, with the order of the steps being editable, and individual steps being removable, addable, or otherwise editable via interaction with the user interface.

20 Claims, 13 Drawing Sheets

DIGITAL ASSESSMENT USER INTERFACE WITH EDITABLE RECOGNIZED TEXT OVERLAY

FIELD OF THE INVENTION

This disclosure relates to the field of systems and methods by which a captured digital image may be converted into recognized text, which may be organized and included in an editable overlay of a user interface.

SUMMARY OF THE INVENTION

In an example embodiment, a system may include a client device and a server. The client device may include an imaging device configured to capture digital images, a memory device, and an electronic screen configured to display a user interface. The server may include a processor in electronic communication with the client device via an electronic communication network, the processor being configured to execute computer-readable instructions. The computer-readable instructions, when executed, may cause the processor to send an assessment item part to the client device to be displayed via the user interface, receive a digital image from the client device, process the digital image with a trained artificial intelligence algorithm to produce boundaries and response data, the response data comprising ordered steps of recognized text, generate a first layer comprising the digital image, generate a second layer comprising the boundaries, generate a third layer comprising the response data, provide the first, second, and third layers to the client device to be displayed via the user interface, such that the second layer is superimposed over the first layer, and the third layer is selectively expandable and retractable over the first and second layers, generate updated response data in response to a detected interaction with the user interface, update the third layer to include the updated response data, receive a confirm command from the client device, process the updated response data with a scoring engine to produce grade data, and provide the grade data to the client device to be displayed via the user interface.

In some embodiments, the detected interaction may include selection of a boundary of the boundaries and selection of a delete button displayed within the boundary, and wherein the updated response data omits a step of the ordered steps of recognized text associated with the boundary.

In some embodiments, the detected interaction may include selection of a step of the ordered steps of recognized text and editing of text of the step to produce an edited step, and wherein the updated response data includes the edited step.

In some embodiments, the detected interaction may include selection of an add button and provision of user-defined text, and wherein the updated response data includes a new step in the ordered steps, the new step comprising the user-defined text.

In an example embodiment, a computer system may include a processor in electronic communication with a client device via an electronic communication network, the processor being configured to execute computer-readable instructions. The computer-readable instructions, when executed, may cause the processor to receive a digital image from the client device, apply a machine learning algorithm to the digital image to extract boundaries and response data from the digital image, the response data comprising recognized text organized into ordered steps, and the boundaries defining regions of the digital image from which the recognized text was extracted, receive an command from the client device, update the boundaries and response data in response to the command to produce updated boundaries and updated response data, receive a confirmation command from the client device, process the updated response data with a scoring engine to generate grade data, and send the grade data to the client device.

In some embodiments, the command may be generated in response to selection of a boundary of the boundaries and selection of a delete button displayed within the boundary, and wherein the updated boundaries omit the boundary and the updated response data omits a step of the ordered steps associated with the boundary.

In some embodiments, the command may be generated in response to selection of a step of the ordered steps and editing of text of the step to produce an edited step, and wherein the updated response data includes the edited step.

In some embodiments, the command may be generated in response to selection of an add button and provision of user-defined text, and wherein the updated response data includes a new step comprising the user-defined text.

In some embodiments, the computer-readable instructions, when executed, may cause the processor to generate a first layer comprising the digital image, generate a second layer comprising the boundaries, generate a third layer comprising the response data, and provide the first, second, and third layers to the client device to be displayed via a user interface of the client device, such that the second layer is superimposed over the first layer, and the third layer is selectively expandable and retractable over the first and second layers.

In some embodiments, the computer-readable instructions, when executed, may cause the processor to generate an updated second layer comprising the updated boundaries, generate an updated third layer comprising the updated response data, and provide the updated second layer and the updated third layer to the client device to be displayed via the user interface, such that the updated second layer is superimposed over the first layer, and the updated third layer is selectively expandable and retractable over the first layer and the updated second layer.

In some embodiments, first text of the digital image corresponding to a first step of the ordered steps of the response data may be surrounded by a first boundary of the boundaries when the second layer is superimposed over the first layer at the user interface. Second text of the digital image corresponding to a second step of the ordered steps of the response data may surrounded by a second boundary of the boundaries when the second layer is superimposed over the first layer at the user interface.

In some embodiments, the computer-readable instructions, when executed, may cause the processor to administer a digital assessment via the client device by sending an assessment item part of the digital assessment to the client device.

In an example embodiment, a method may include receiving, by a processor, a digital image, applying, by the processor, a machine learning algorithm to the digital image to extract boundaries and response data, the response data comprising recognized text organized into ordered steps, the boundaries defining regions of the digital image from which the recognized text was extracted, receiving, by the processor, a command via a user interface, updating, by the processor, the boundaries and response data in response to the command to produce updated boundaries and updated response data, receiving, by the processor, a confirmation via the user interface, processing, by the processor, the updated response data with a scoring engine to generate grade data in response to the confirmation, and causing, by the processor, the grade data to be displayed via the user interface.

In some embodiments, the command may be generated in response to selection of a boundary of the boundaries and selection of a delete button displayed within the boundary via the user interface, and wherein the updated boundaries omit the boundary and the updated response data omits a step of the ordered steps associated with the boundary.

In some embodiments, the command may be generated in response to selection of a step of the ordered steps and editing of text of the step to produce an edited step via the user interface, and wherein the updated response data includes the edited step.

In some embodiments, the command is generated in response to selection of an add button and provision of user-defined text via the user interface, and wherein the updated response data includes a new step comprising the user-defined text.

In some embodiments, the method may further include generating, by the processor, a first layer comprising the digital image, generating, by the processor, a second layer comprising the boundaries, generating, by the processor, a third layer comprising the response data, and providing, by the processor, the first, second, and third layers to be displayed via the user interface, such that the second layer is superimposed over the first layer, and the third layer is selectively expandable and retractable over the first and second layers.

In some embodiments, the method may further include generating, by the processor, an updated second layer comprising the updated boundaries, generating, by the processor, an updated third layer comprising the updated response data, and providing, by the processor, the updated second layer and the updated third layer to be displayed via the user interface, such that the updated second layer is superimposed over the first layer, and the updated third layer is selectively expandable and retractable over the first layer and the updated second layer.

In some embodiments, first text of the digital image corresponding to a first step of the ordered steps of the response data may be surrounded by a first boundary of the boundaries when the second layer is superimposed over the first layer at the user interface. Second text of the digital image corresponding to a second step of the ordered steps of the response data may be surrounded by a second boundary of the boundaries when the second layer is superimposed over the first layer at the user interface.

In some embodiments, the method may further include administering, by the processor, a digital assessment via the user interface at least in part by causing an assessment item part of the digital assessment to be displayed via the user interface.

The above features and advantages of the present invention will be better understood from the following detailed description taken in conjunction with the accompanying drawings.

DETAILED DESCRIPTION

Figure 1:
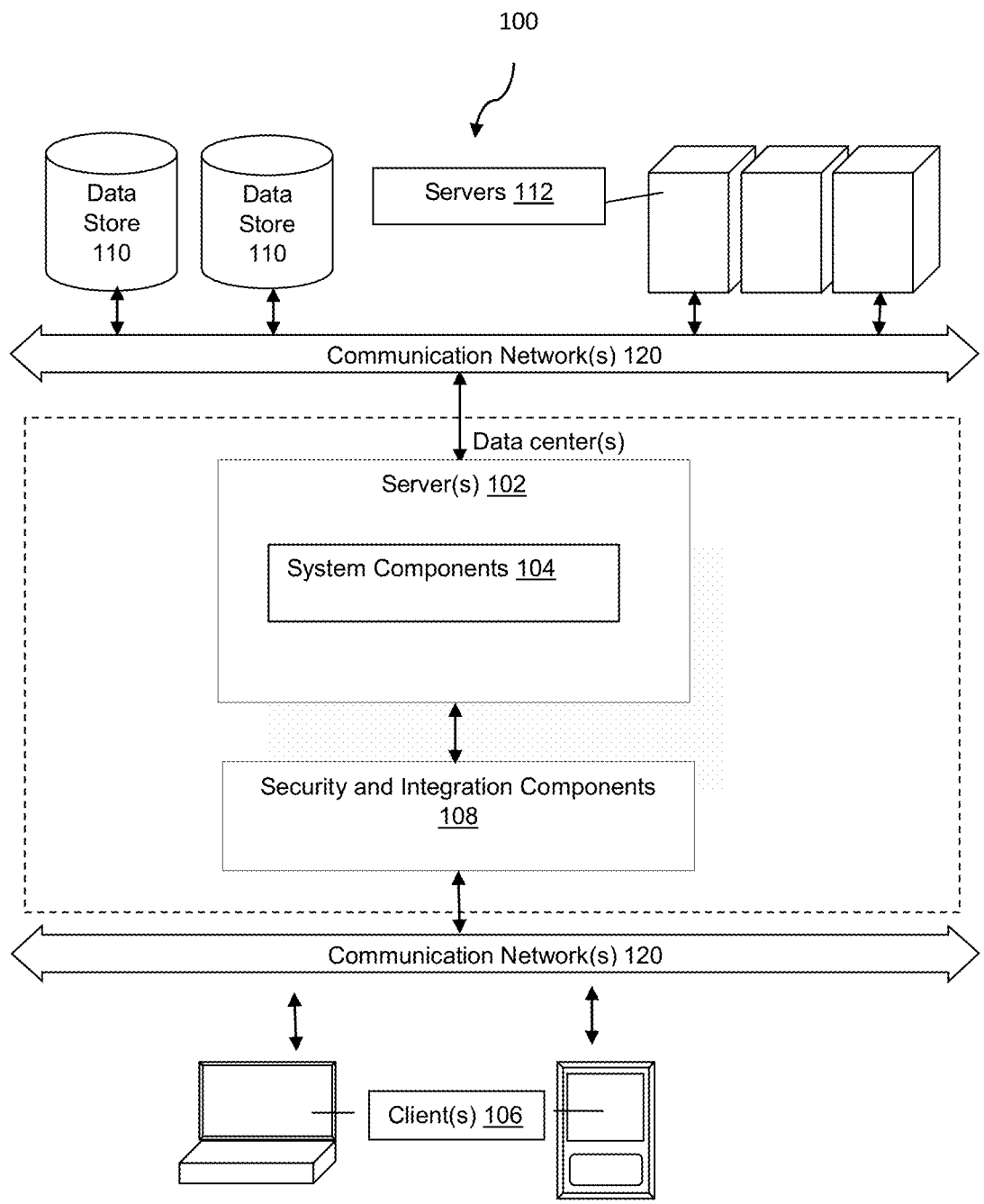
FIG. 1 illustrates a system level block diagram showing data stores, data centers, servers, and clients of a distributed computing environment, in accordance with an embodiment.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
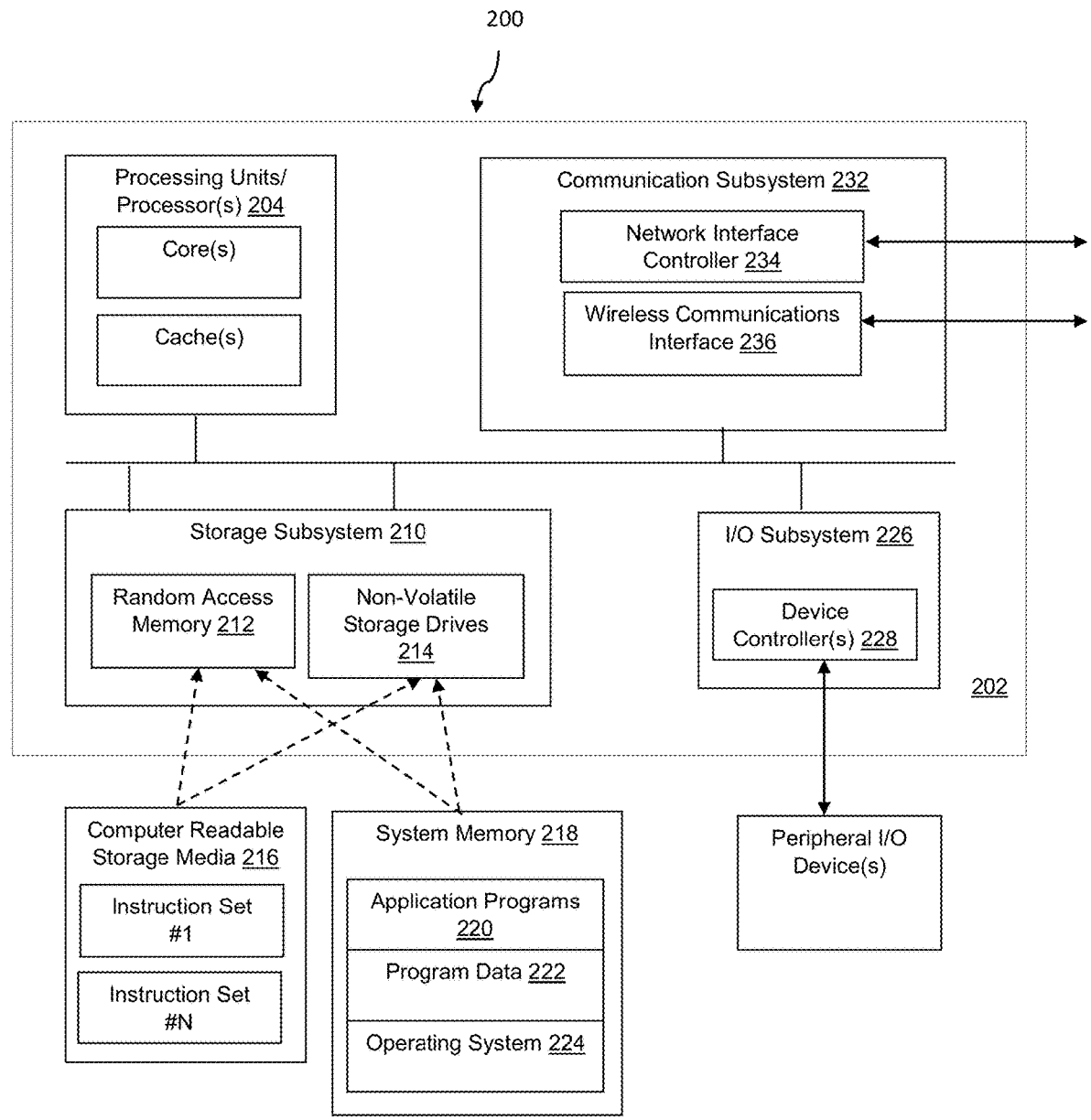
FIG. 2 illustrates a system level block diagram showing physical and logical components of a special-purpose computer device within a distributed computing environment, in accordance with an embodiment.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, cameras, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), digital images, digital video, etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

In some embodiments, the computer system 200 may include or may be coupled to a camera or scanner (e.g., which may be included in or coupled to the I/O subsystem 226).

Returning to FIG. 1, the clients 106 may communicate with the servers 102, 112 and/or the data stores 110 via the communication network 120 in order to administer a digital assessment (e.g., corresponding to a homework assignment, test, activity, or other applicable type of digital assessment, which may be summative or formative). The digital assessment may be organized into one or more assessment items, each including one or more assessment item parts, to which a user (e.g., sometimes referred to as a student or a responder) may submit a response. For example, an assessment item part may be any of a "selected response" problem (e.g., a multiple-choice problem, true-false problem, matching problem, etc.), a fill-in-the-blank problem, a short answer problem, or a long answer problem. In some embodiments, an assessment item part may be a math problem that requires a responder to submit multiple, ordered steps as a response (e.g., in order to demonstrate that the responder solved the math problem according to a particular technique).

A given client 106 may display a user interface on an electronic screen. The user interface may depict an assessment item part to which a response may be submitted in the form of a digital image via interaction with the user interface. For example, the assessment item part may be a math problem (e.g., simplification of a given expression) that requires a response in the form of ordered steps (e.g., to demonstrate that the math problem is being solved according to a particular method). It should be understood that other types of assessment item parts (e.g., related to history, writing, language, etc.) may be provided via the user interface, to which handwritten responses may also be submitted in the form of digital images.

A prompt may be provided via the user interface requesting the submission of a captured and/or stored digital image as a response to the assessment item part. For example, a given submitted digital image may depict text (e.g., handwritten text) corresponding to a response to the assessment item part provided at the user interface.

The text of the submitted digital image may be arranged in rows, with each row corresponding to a different step. Upon submission by the user via the user interface of the client 106, the digital image may be provided (e.g., via the communication network 120) to an artificial intelligence (AI) module (e.g., implemented by one or more of the servers 112) that process the digital image using an AI algorithm, such as a machine learning algorithm (e.g., a neural network algorithm, a random forest algorithm, a gradient boosted regression trees algorithm, or another applicable machine learning algorithm). For example, the AI algorithm may be trained to recognize text, such as handwritten text, that is present in a digital image, and to output the recognized text. In some embodiments, in addition to outputting recognized text, the AI algorithm may be trained to organize the recognized text into ordered steps (e.g., with rows of text shown in the digital image delineating the steps into which the recognized text is organized). The recognized text organized into ordered steps may be referred herein to as "response data". Additionally, in some embodiments, the AI algorithm may be trained to output boundaries corresponding to (e.g., bounding) regions of the digital image from which recognized text was identified. For example, a digital image depicting two rows of handwritten text may be input to the AI algorithm. First and second boundaries may be generated by the AI algorithm. The first boundary may be positioned to bound (e.g., surround; form a perimeter around) a first row of the two rows of text in the digital image, and may be indicated (e.g., in memory) as corresponding to a first step of the response data. The second boundary may be positioned to bound (e.g., surround; form a perimeter around) a second row of the two rows of text in the digital image, and may be indicated (e.g., in memory) as corresponding to a second step of the response data.

In some embodiments, after the boundaries and response data are generated using the AI algorithm, the digital image, the boundaries, and the response data may be depicted as respectively different layers of the user interface. For example, a first layer of the user interface may include the digital image, a second layer may include the boundaries (e.g., which may be depicted as solid or dotted lines), and a third layer may include the recognized text, which may be organized into ordered steps (e.g., the response data). In the user interface, the second layer may be superimposed over the first layer, such that a given boundary will be shown to surround the region of the digital image to which that boundary, and the associated portion of the recognized text, correspond. In the user interface, the third layer (sometimes referred to as an overlay layer) may be selectively expanded or retracted in response to an interaction with a button, which may be referred to as an "overlay toggle button," of the user interface. For example, the overlay toggle button may be selected via the user interface when the overlay layer is expanded in order to retract the overlay layer, and may be selected via the user interface when the overlay layer is retracted in order to expand the overlay layer. When retracted, the overlay layer may be partly or entirely hidden, so that the first and second layers are shown. When expanded, the overlay layer may partly or entirely cover (i.e., overlay) the first and second layers, such that some or all of the first and second layers may not be visible while the overlay layer is expanded.

A user may interact with the boundaries and/or the response data shown in the second and third layers (e.g., via an input device such as a touchscreen, a mouse, or a keyboard) in order to edit the response data, as will be described. Once a user is satisfied with the accuracy of the response data, the user may select a confirmation button of the user interface to submit the response data. The response data may then be routed to a scoring engine, which may process the response data to generate grade data corresponding to the response data. For example, the grade data may include an indication of whether each step of the response is "correct" (e.g., which may be represented by a binary "1") or "incorrect" (e.g., which may be represented by a binary "0"), and may include an overall grade for the response data (e.g., which may be an average of the grades of the individual steps). For example, if three out of four steps included in a given set of response data are determined by the scoring engine to be correct, and the remaining step is determined to be incorrect, the overall grade for the response data may be 0.75 or 75%. In other embodiments, if any step of the response data is determined to be incorrect, the overall grade of the response data may be indicated as incorrect. The grade data (e.g., including the overall grade and the grades for individual steps) may then be displayed via the user interface. In some embodiments, information may be displayed along with the grade data, which may explain why a particular step is incorrect and/or may provide an example of a correct step/response.

Figure 3A:
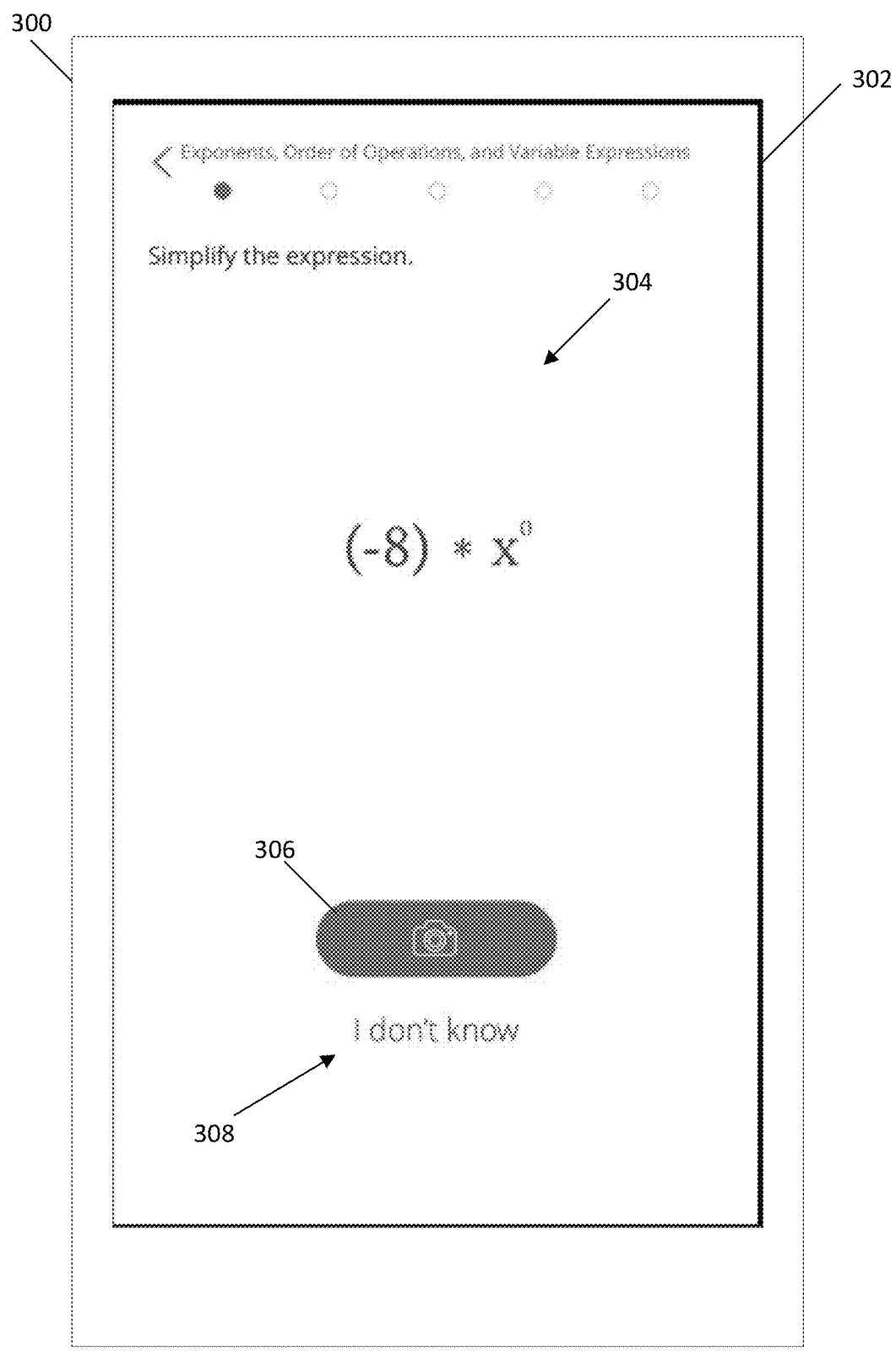
FIG. 3A illustrates an assessment screen of a user interface that may be shown on a client device, depicting an assessment item part to which a response may be submitted in the form of a digital image, in accordance with an embodiment.

FIG. 3A shows an example of an assessment screen of a user interface 302 displayed on an electronic screen of a client device 300 (e.g., client 106 of FIG. 1) As shown, the assessment screen depicts an assessment item part 304 to which a response may be submitted in the form of a digital image. In the present example, the assessment item part 304 is shown to be a math problem (e.g., simplification of a given expression) that requires ordered steps as a response. While the present example relates to responding to a math problem, it should be understood that other types of assessment item parts (e.g., related to history, writing, language, etc.) may be provided via the user interface, to which handwritten responses may also be submitted in the form of digital images.

In order to submit a response to the assessment item part 304, the button 306 may be selected, and a prompt may be provided via the user interface requesting the submission of a captured and/or stored digital image as a response to the assessment item part 304, or the user interface may navigate directly to a screen at which such a digital image may be captured or selected from memory. For example, the digital image may depict text (e.g., handwritten text) corresponding to a response to the assessment item part 304. The button 308 may be selected in order to access a hint or solution related to the assessment item part 304. The availability of a hint or solution may depend on the type of digital assessment that is being administered via the user interface.

Figure 3B:
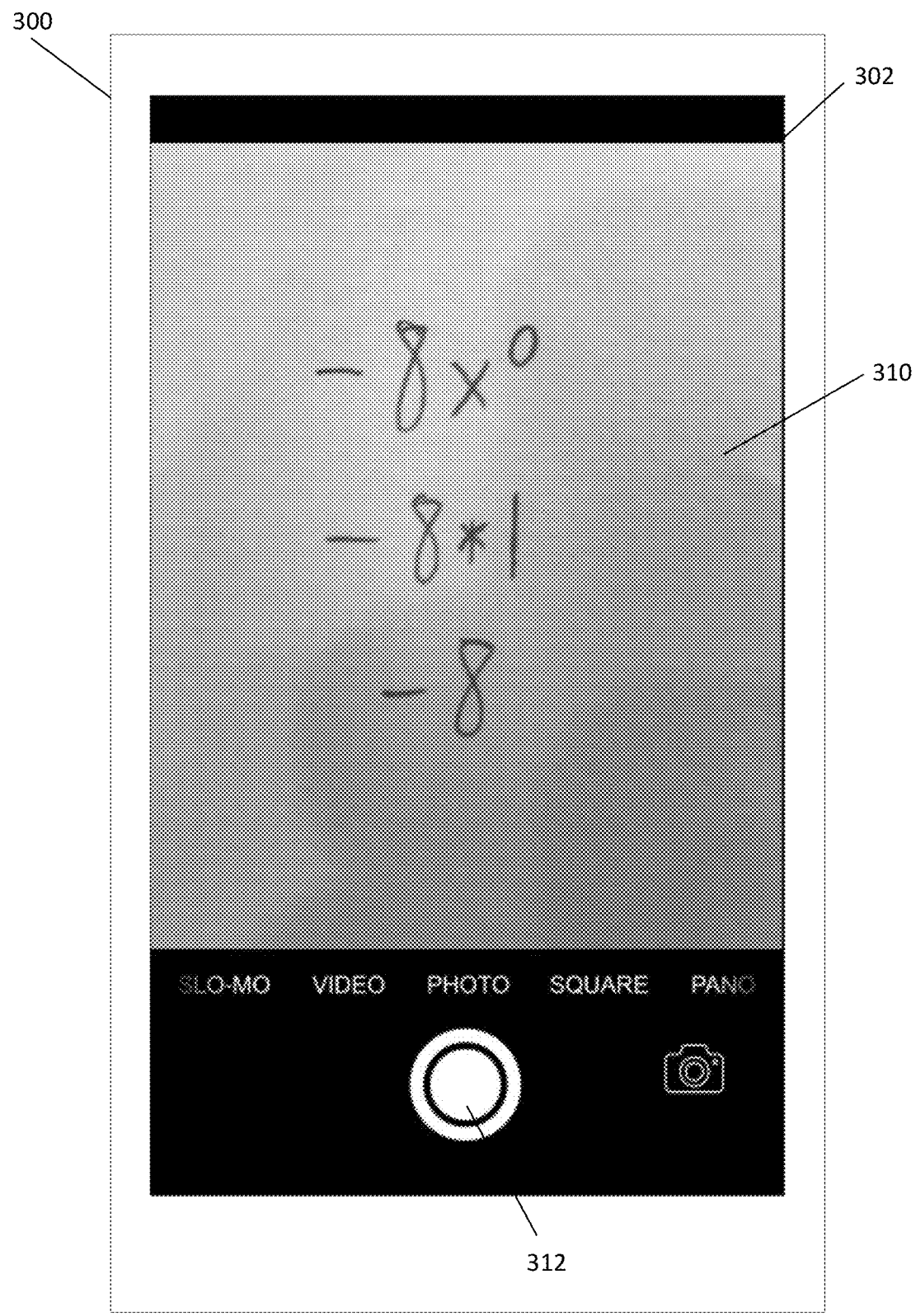
FIG. 3B illustrates an image capture screen of the user interface that may be shown while capturing a digital image to be submitted in response to the assessment item part, in accordance with an embodiment.

FIG. 3B shows an example of an image capture screen of the user interface 302 of the client device 300, which may be displayed in response to the selection (e.g., via an interaction with the user interface) of the button 306. A stream of real-time image data (e.g., captured by a camera of the client device 300) may be displayed in a region 310 of the image capture screen. A digital image may be captured (e.g., by the camera) and stored in a memory of the client device 300 in response to the selection (e.g., via an interaction with the user interface) of a button 312.

Figure 3C:
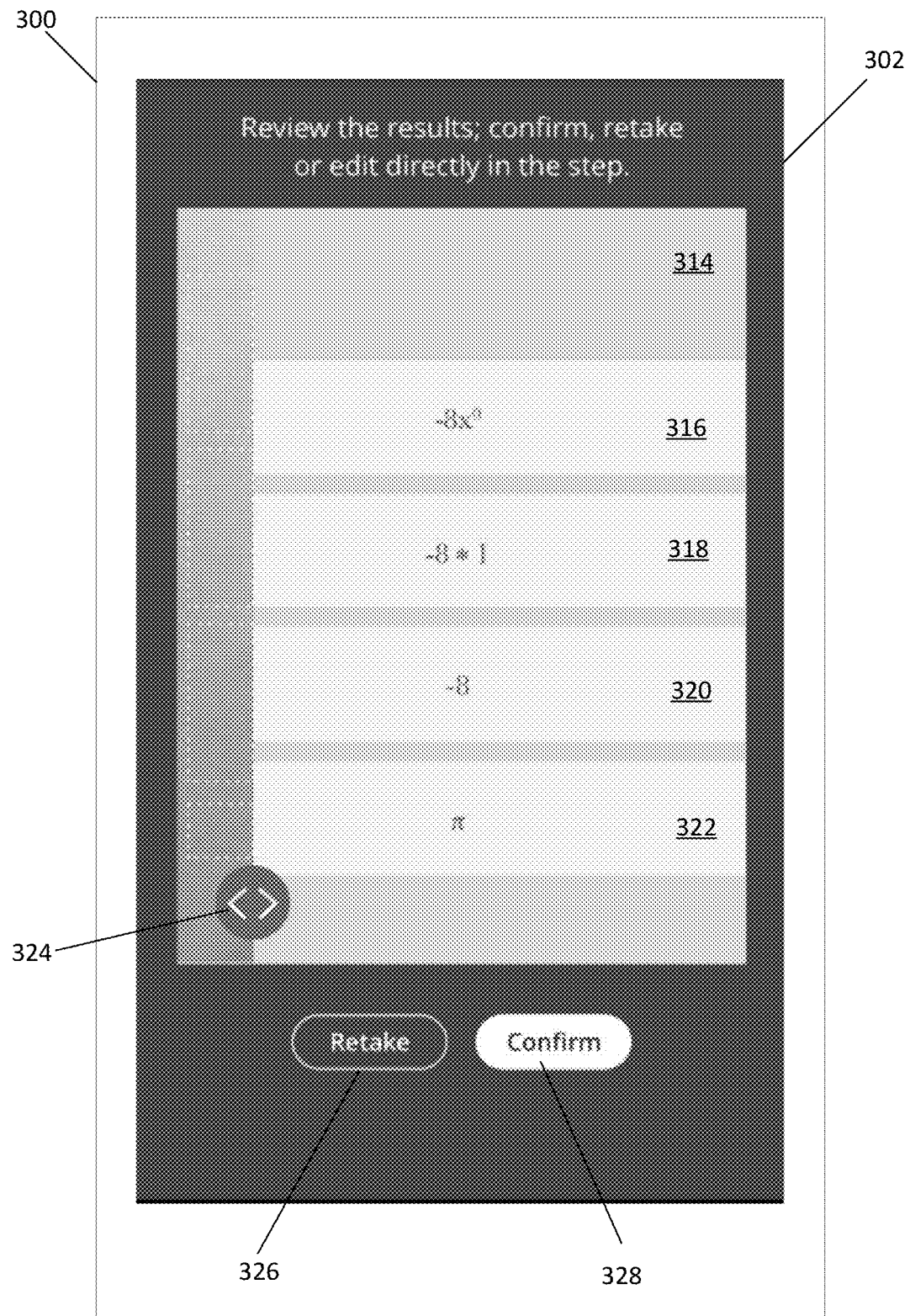
FIG. 3C illustrates a review/edit screen of the user interface that may be shown after submitting the digital image in response to the assessment item part, the screen including an overlay layer that includes response data that includes recognized text from the digital image organized into ordered steps, in accordance with an embodiment.

FIG. 3C shows an example of a review/edit screen of the user interface 302 of the client device 300 in which an overlay layer 314 is expanded. The review/edit screen may be displayed in response to the capture of a digital image via the image capture screen, or the selection of a digital image stored on a memory of the client device 300 (e.g., via an image selection screen of the user interface 302). As shown, the overlay layer 314 includes several ordered steps 316, 318, 320, 322. The steps 316, 318, 320, 322 may be considered "response data" and may be generated as an output of an AI algorithm executed by a server (e.g., servers 112, system 200, FIGS. 1, 2) in electronic communication with the client device 300 (e.g., via a communication network such as communication networks 120 of FIG. 1). The AI algorithm may output the response data as a result of processing the captured digital image (e.g., submitted via the image capture screen or the image selection screen of the user interface 302). While steps 316, 318, and 320 correspond to the simplification of the expression of the assessment item part 304, the step 322 corresponds to an erroneous recognition made by the AI algorithm (i.e., the π symbol not actually being present in the captured digital image). It may therefore be beneficial for the user of the client device 300 to be provided with the option to edit the response data so that such erroneous steps may be manually removed via interaction with the user interface 302.

A toggle button 324 may be included in the review/edit screen of the user interface 302, which, when selected, may cause the state of the overlay layer 314 to be toggled between an expanded state (shown in the present example) and a retracted state (shown in the example of FIG. 3D, below).

A retake button 326 may be included in the review/edit screen of the user interface 302, which, when selected, may return to the image capture screen or the image selection screen of the user interface 302.

A confirm button 328 may be included in the review/edit screen of the user interface 302, which, when selected, may cause the response data to be submitted to the server for grading via a scoring engine. Grade data and/or feedback data output by the scoring engine may be output by the scoring engine as a result of processing the response data. The grade data and/or feedback data may be displayed on an evaluation screen of the user interface 302 (e.g., as shown in FIG. 3H).

Figure 3D:
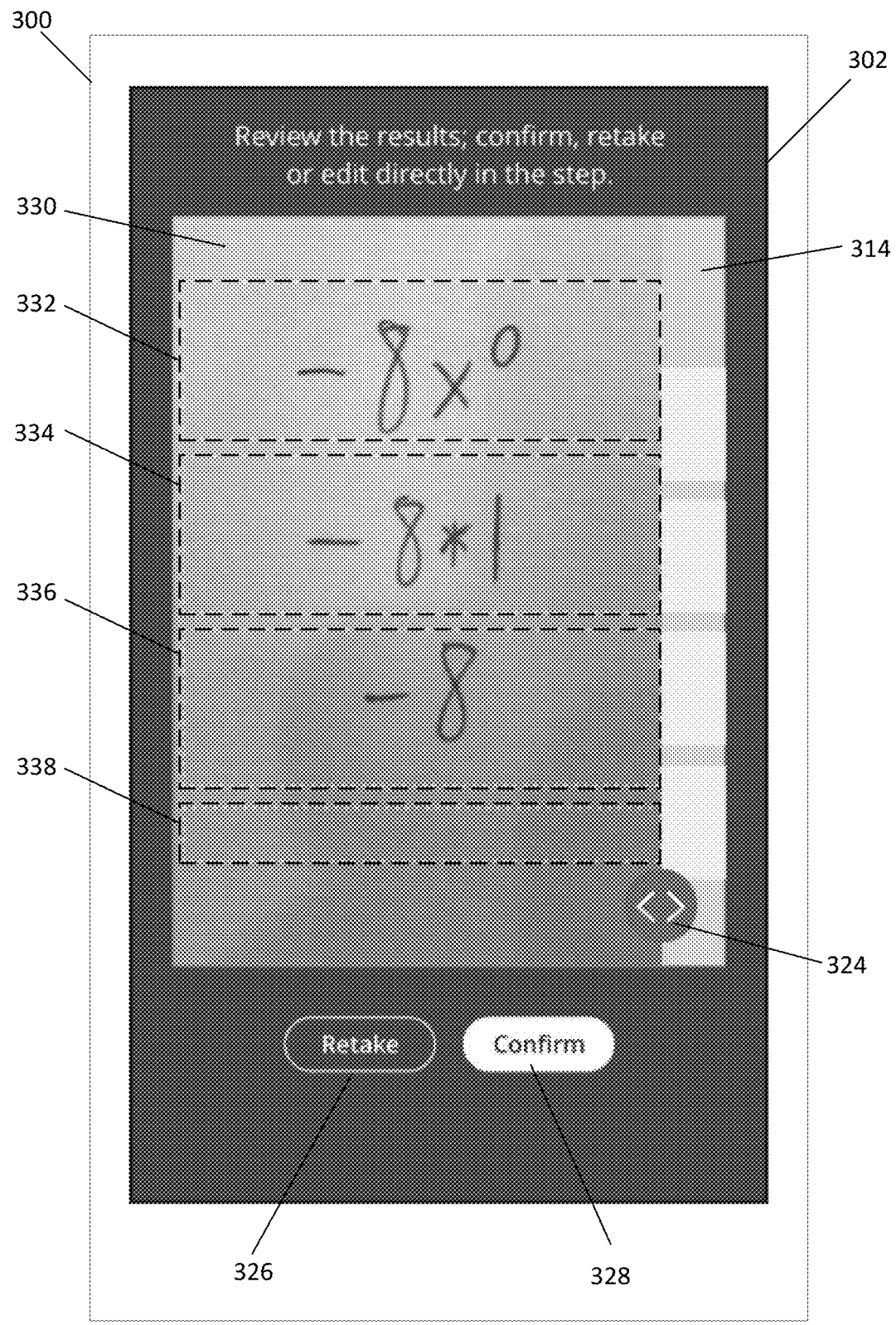
FIG. 3D illustrates the review/edit screen of the user interface shown in FIG. 3C, in which the overlay layer has been retracted in response to an interaction with the user interface to reveal the submitted digital image of a first layer that is overlaid with boundaries of a second layer, in accordance with an embodiment.

FIG. 3D shows an example of the review/edit screen of the user interface 302 of the client device 300 in which the overlay layer 314 is retracted (e.g., partially hidden) to show the digital image 330 that was captured via the image capture screen of the user interface 302 (or, in some embodiments, selected from the image selection screen of the user interface 302). As shown, the digital image 330 is overlaid with boundaries 332, 334, 336, 338. The boundaries may be generated as outputs of the AI algorithm in addition to the response data, with each boundary corresponding to a different recognized step of the response data. For example, the boundary 332 corresponds to the step 316, the boundary 334 corresponds to the step 318, the boundary 336 corresponds to the step 320, and the boundary 338 corresponds to the step 322. For the boundaries 332, 334, 336, the text contained within each boundary matches the text of the corresponding steps 316, 318, 320, respectively. However, for the boundary 338 (sometimes referred to as the erroneous boundary 338), no text is present within the boundary, but the AI algorithm has erroneously identified the area bounded by the boundary 338 as including the π symbol, despite no such symbol being present in the digital image 330. Other possible errors may include the improper recognition of text that may be present in a digital image that is not part of the response data that a user intends to submit in response to the assessment item part, the improper recognition of a given character as a different character, the improper recognition of two separate steps as a single step, or the improper recognition of the order of steps, for example.

Figure 3E:
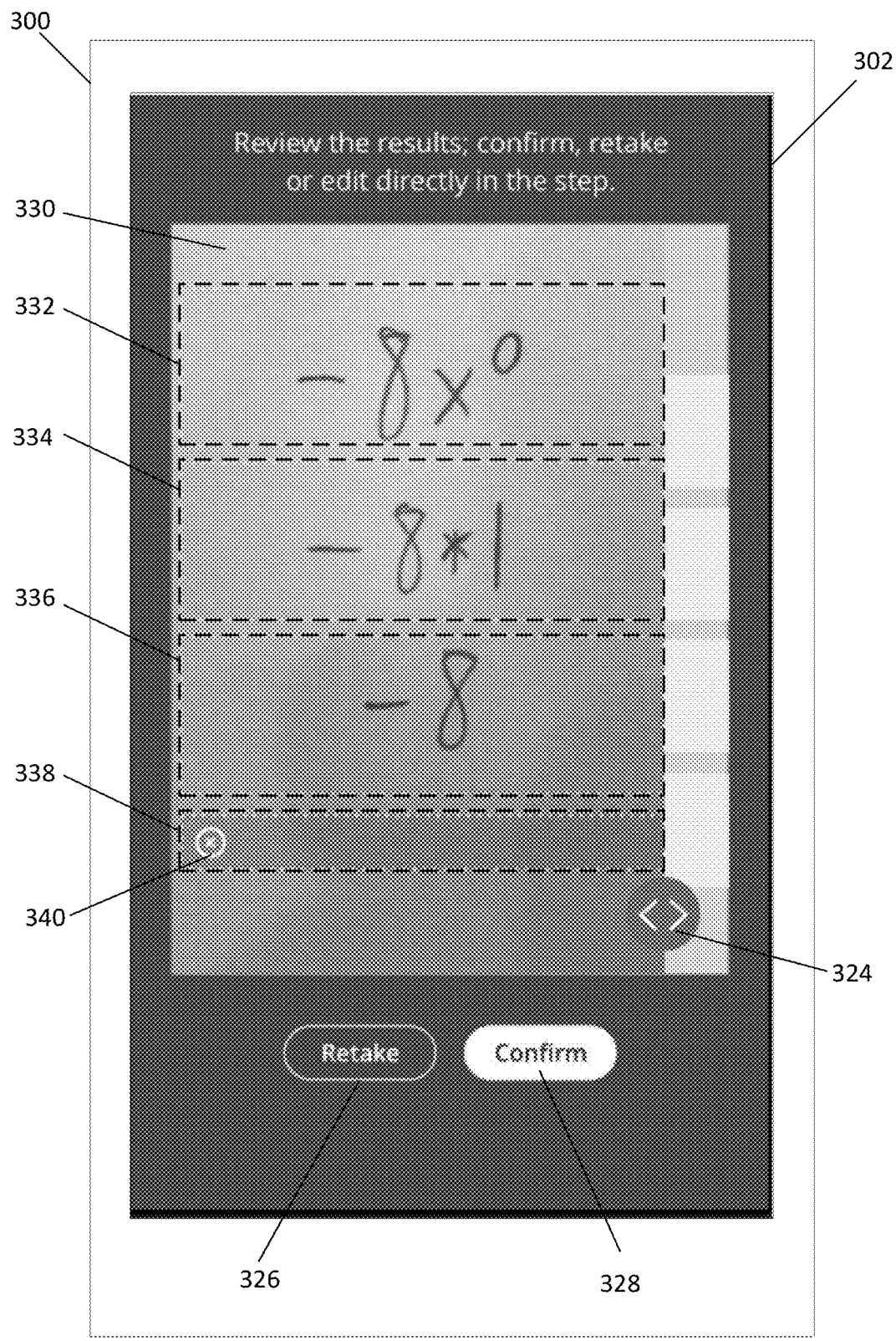
FIG. 3E illustrates the review/edit screen of the user interface shown in FIG. 3D, in which a boundary of the second layer has been highlighted in response to selection via the user interface, in accordance with an embodiment.

FIG. 3E shows an example of the review/edit screen of the user interface 302 of the client device 300 in which the erroneous boundary 338 has been selected, causing the erroneous boundary 338 to be highlighted and causing a delete button 340 to be displayed over the highlighted portion of the erroneous boundary 338.

Figure 3F:
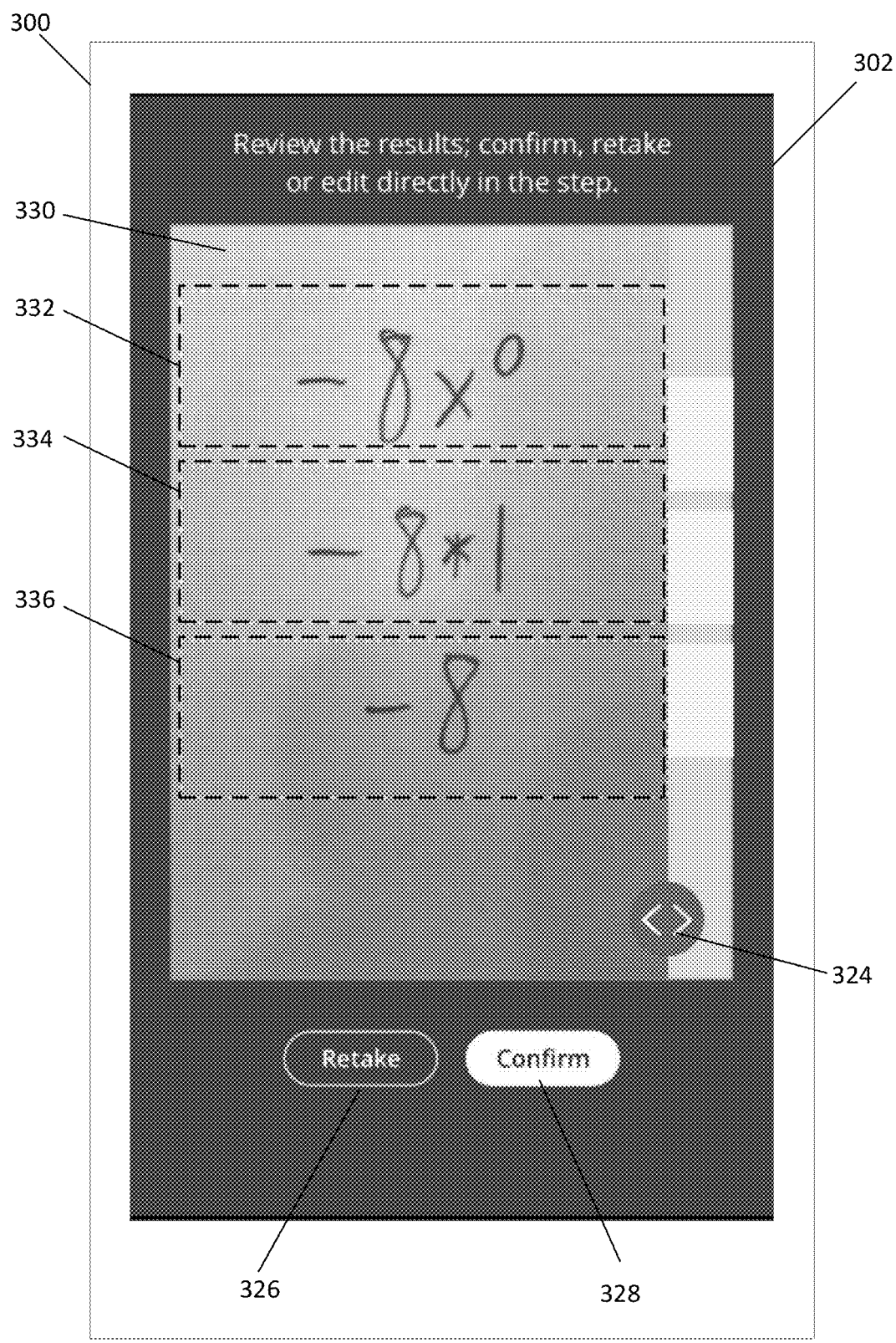
FIG. 3F illustrates the review/edit screen of the user interface shown in FIG. 3D, in which a boundary of the second layer has been deleted in response to an interaction with the user interface, in accordance with an embodiment.

FIG. 3F shows an example of the review/edit screen of the user interface 302 of the client device 300 in which the erroneous boundary 338 has been removed following the selection of the delete button 340 shown in FIG. 3E.

Figure 3G:
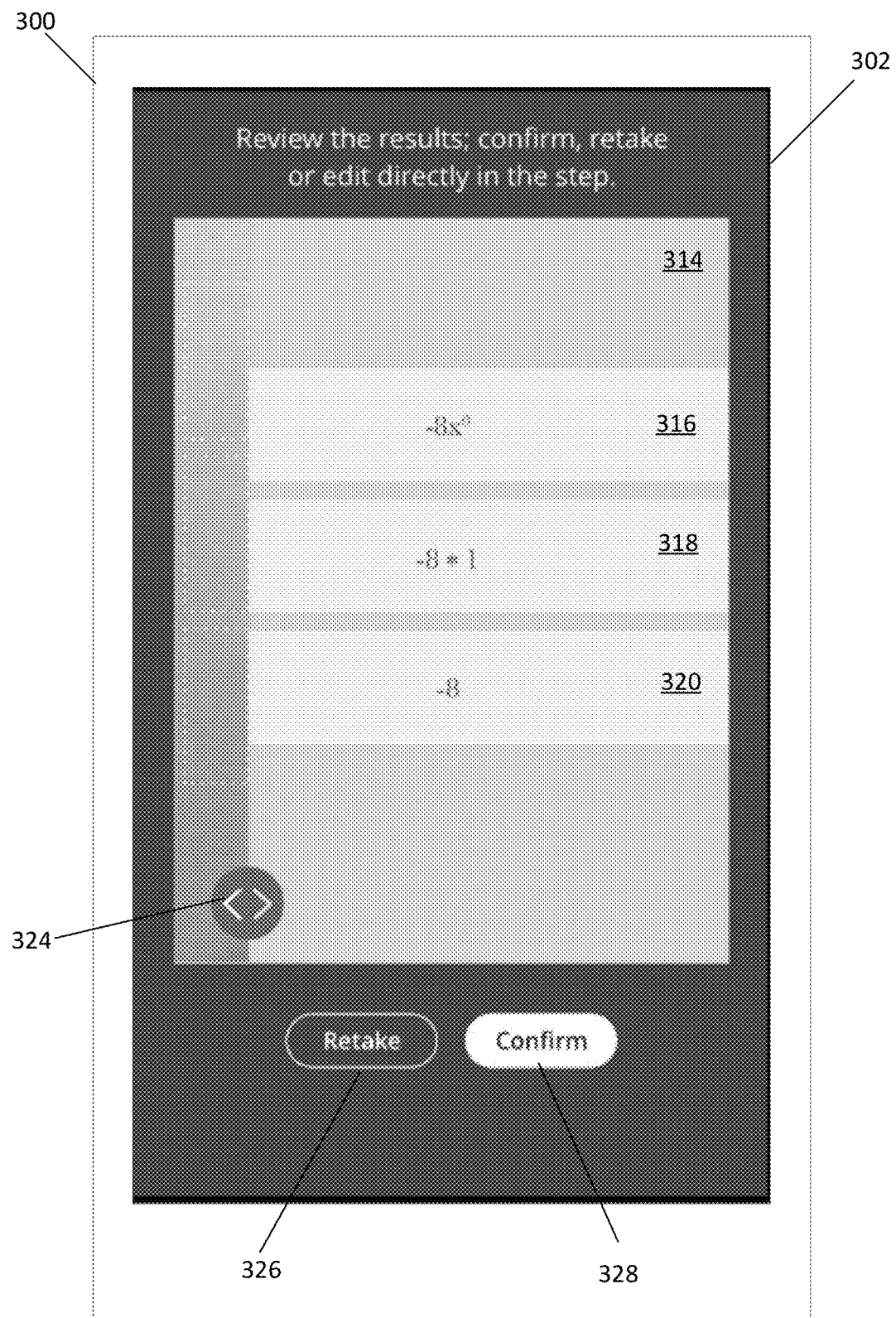
FIG. 3G illustrates the review/edit screen of the user interface shown in FIG. 3C, in which a step of the response data of the overlay layer has been removed in connection with the deletion of a boundary of the second layer to produce edited response data, in accordance with an embodiment.
Figure 3H:
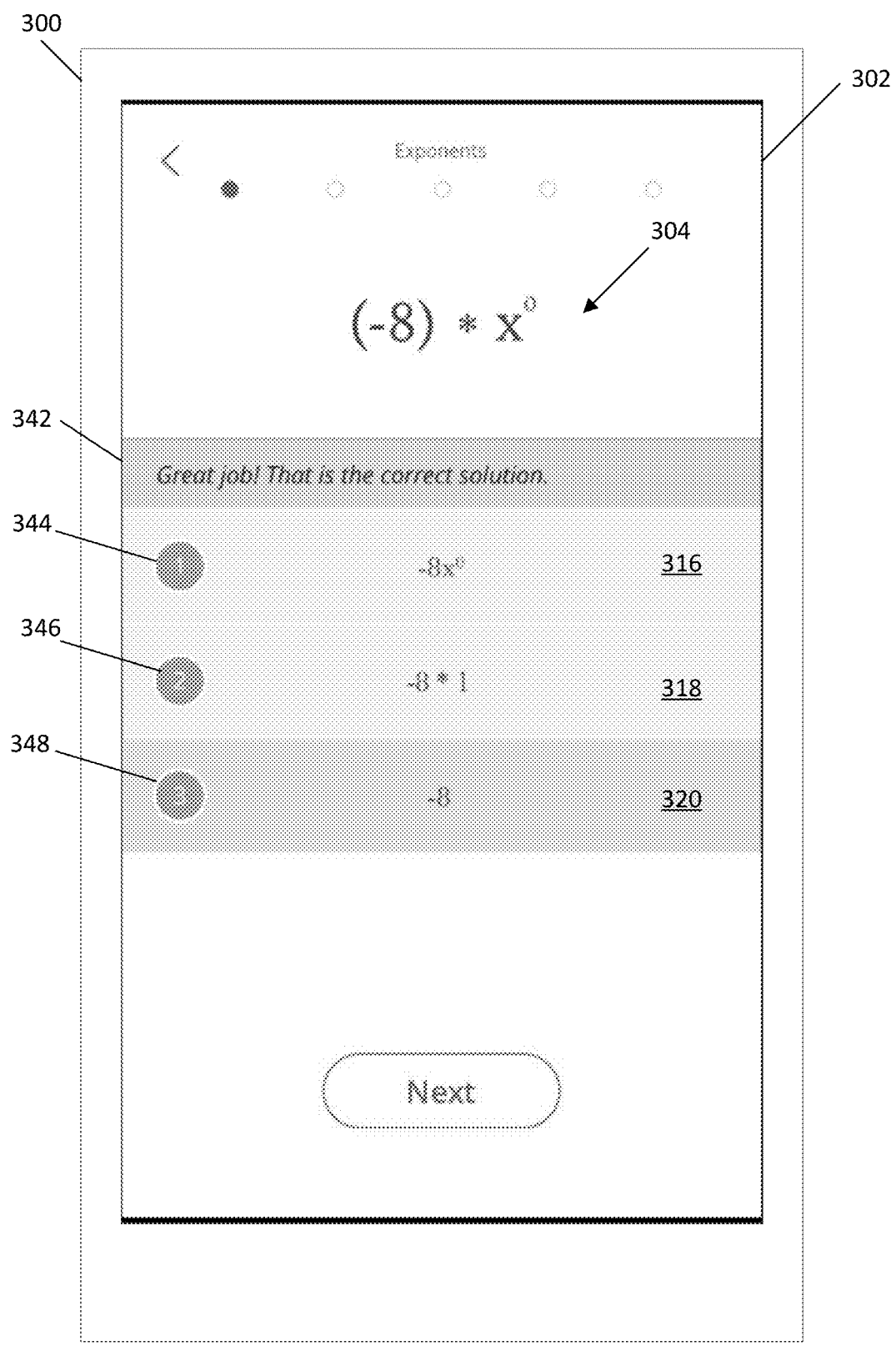
FIG. 3H illustrates an evaluation screen of the user interface that may be shown after the edited response data is submitted to and processed by a scoring engine, in accordance with an embodiment.

FIG. 3G shows an example of the review/edit screen of the user interface 302 of the client device 300 in which the overlay layer 314 has been expanded following the removal of the erroneous boundary 338. As shown, the removal of the erroneous boundary 338 has resulted in the removal of the erroneous step 322. Thus, a user may interact with the boundaries shown in the second layer of the review/edit screen of the user interface 302 in order to make changes to the steps included in the response data. It should be understood that other changes may be made to the response data by manipulating the boundaries via the user interface. For example, boundaries may be dragged to new locations and/or re-sized in order to change the content included in each step of the response data, and/or to change the order in which the steps are listed. In some embodiments, the steps 316, 318, and 320 themselves may be re-ordered directly by dragging and dropping the block containing a given step to a new location in the overlay layer 314.

FIG. 3H shows an example of an evaluation screen of the user interface 302, which may be shown after the response data extracted from the captured digital image has been submitted (e.g., potentially after editing the response data via the review/edit screen of the user interface 302). As shown, the steps 316, 318, 320 corresponding to the updated response data may be displayed alongside corresponding grades 344, 346, 348, and below feedback 342. Each grade in the present example may be colored red to indicate an incorrect step, or may be colored green to indicate a correct step, and the number shown on each grade may correspond to the order number of the step.

In the present example, all of the steps of the submitted response data were determined by the scoring engine to be correct, so the grades 344, 346, 348 and the feedback 342 are shown in green. In some embodiments, rather than just a color-coded scheme for relaying grade data, numerical grade information may instead or may additionally be shown (e.g., with correct steps being assigned a grade shown as 1/1 and incorrect steps being assigned a grade shown as 0/1, and the overall grade being shown as a fraction of the number of correct steps over the total number of steps).

Figure 3I:
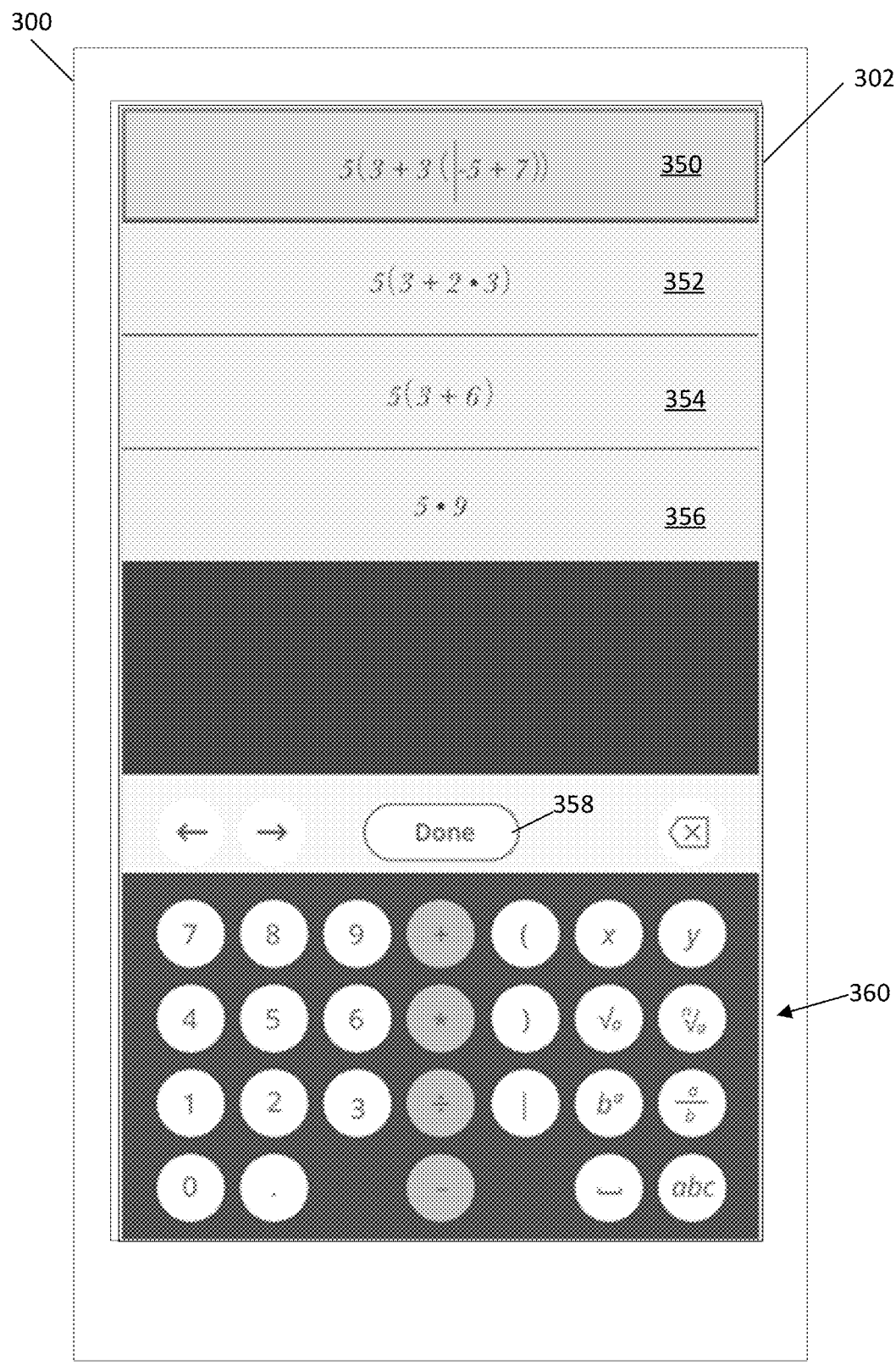
FIG. 3I illustrates a text edit screen of the user interface on which an electronic keyboard is displayed below response data of an overlay layer, where interactions with the electronic keyboard cause text of the response data to be manually edited, in accordance with an embodiment.

FIG. 3I shows an example of a text edit screen of the user interface 302, which may be shown in response to the selection of text of an overlay layer. Steps 350, 352, 354, and 356 may be included in the overlay layer, and the text of step 350 may be selected from the overlay layer in order to cause the user interface 302 to display the text edit screen. As shown, the step being edited at the text edit screen (i.e., step 350) may be highlighted to distinguish it from the steps that are not being edited (i.e., steps 352, 354, 356). A keyboard 360 may be displayed at a bottom section of the text edit screen of the user interface 302. in the present example, the keyboard 360 includes a number of selectable, math-related inputs. It should be understood that the content included in the keyboard 360 may vary according to the type of digital assessment being administered at the time the keyboard 360 is accessed. For example, different subjects within the topic of mathematics may be associated with different layouts of the keyboard 360 (e.g., such that a calculus layout may be defined that includes integral, derivative, and limit inputs, a trigonometry layout may be defined that includes sine, cosine, and tangent inputs, and/or a statistics layout may be defined that includes mean, variance, and standard deviation inputs). For example, digital assessments related to English/literature topics may include a more standard, letter-focused layout for the keyboard 360. For example, digital assessments related to language topics may include different, selectable keyboard layouts for the user's native language and for the language being studied. As shown, a cursor may mark the location within the text of the step 350 at which new text submitted via the keyboard 360 will be added, and immediately behind which text may be deleted by pressing a backspace key of the keyboard 360. It should be noted that the steps 350, 352, 354, 356 shown in the text edit screen of the present example include different text than the steps 316, 318, 320, and should not be construed as corresponding to the assessment item part 304 or the captured digital image 330. Once a user has finished editing the text of the selected step 350, the "done" button 358 may be selected to confirm and finalize any changes made to the text. The user interface 302 may then return to the review/edit screen.

Figure 4:
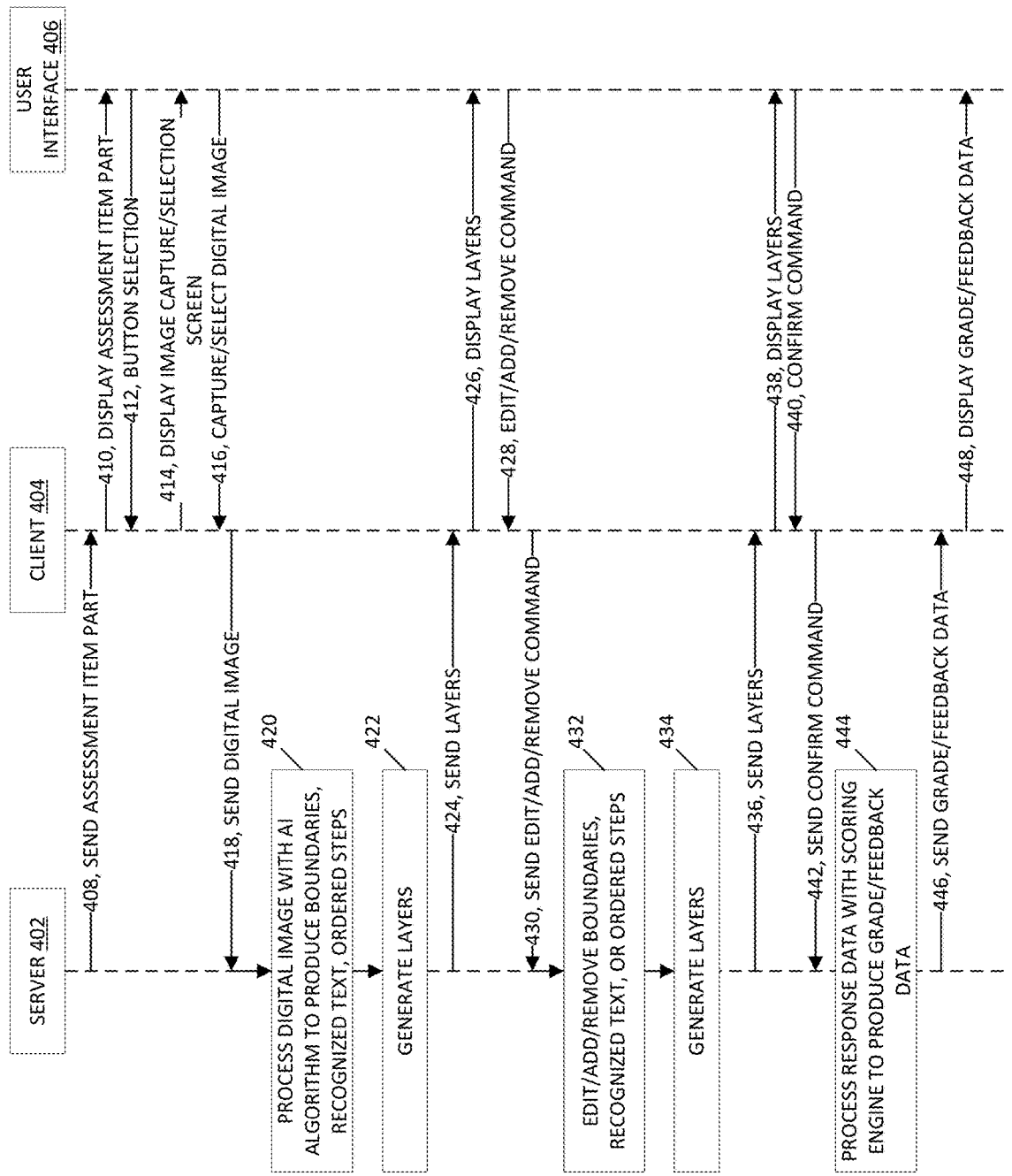
FIG. 4 illustrates a sequence diagram showing illustrative dataflow between and functions performed by a server, client, and user interface in connection with a method of submitting, processing, editing, and scoring a digital-image-based response to an assessment item part, in accordance with an embodiment.

FIG. 4 shows a sequence diagram illustrating communications between and functions performed by a server 402 (e.g., servers 112, system 200, FIGS. 1 and 2), a client 404 (e.g., clients 106, system 200, FIGS. 1 and 2), and a user interface 406 (e.g., user interface 302 of FIGS. 3A-3I). The server 402 may be coupled to the client 404 via an electronic communication network (e.g., communication network 120 of FIG. 1). In this example, functions performed by the server 402 may be performed by one or more processors (e.g., processors 204 of FIG. 2) of the server 402 executing computer-readable instructions stored in a memory (e.g., storage subsystem 210 of FIG. 2) of the server 402. In this example, functions performed by the client 404 may be performed by one or more processors (e.g., processors 204 of FIG. 2) of the client 404 executing computer-readable instructions stored in a memory (e.g., storage subsystem 210 of FIG. 2) of the client 404.

At step 408, the server 402 sends an assessment item part (e.g., assessment item part 304 of FIG. 3A) to the client 404 via the electronic communication network. The server 402 may send the assessment item part to the client 404 as part of a digital assessment being administered by the server 402 via the client 404, for example.

At step 410, the client 404 sends data to the user interface 406, causing the user interface 406 to display the assessment item part.

At step 412, the user interface 406 sends data to the client 404 indicating that an interaction has been performed at the user interface 406 corresponding to the selection of an button (e.g., button 306 of FIG. 3A). The selection of the button may correspond to a request to navigate to an image selection screen or an image capture screen of the user interface 406.

At step 414, the client 404 sends data to the user interface 406, causing the user interface 406 to display an image capture or image selection screen. At the image capture screen, a camera of the client 404 may be interacted with to capture and store a digital image (e.g., digital image 330 of FIG. 3D). At the image selection screen, a stored digital image may be selected for retrieval from a memory of the client 404.

At step 416, the user interface 406 sends data to the client 404 corresponding to the capture or selection of a digital image in response to an interaction performed at the image capture or image selection screen, respectively.

At step 418, the client 404 sends the captured or selected digital image to the server 402 via the communication network.

At step 420, the server 402 provides the digital image as an input to a trained AI algorithm, which outputs a set of boundaries and response data. The response data may include recognized text from the digital image organized into ordered steps.

At step 422, the server 402 generates first, second, and third (e.g., overlay) display layers using the digital image and the outputs of the AI algorithm. The first layer may include the digital image. The second layer may include the boundaries output by the AI algorithm. The third layer may include the recognized text of the response data arranged in ordered steps.

At step 424, the server 402 sends the display layers to the client 404 via the communication network.

At step 426, the client 404 provides the display layers to the user interface 406 to be displayed. For example, the second layer may be displayed superimposed over the first layer, with the boundaries of the second layer surrounding corresponding text of the first layer from which the recognized text of the response data was extracted by the AI algorithm. The third layer may be selectively displayed by the user interface 406 in either a retracted state in which the third layer is totally or partially hidden to reveal the first and second layers, or an expanded state in which the third layer partially or totally overlaps the first and second layers. The third layer may be switched between the retracted state and the expanded state via the selection of a toggle button of the user interface 406.

At step 428, the user interface 406 sends data to the client 404 indicating an interaction with the user interface 406 indicative of a command to edit, add, or remove one of the boundaries, the recognized text, or one of the ordered steps of the response data. For example, if new step is added via the command, user-defined text may be included in the new step. The user-defined text may be provided via a keyboard (e.g., a virtual keyboard displayed on the user interface or a physical keyboard coupled to the client 404). For example, the new step may be added to the ordered steps of the response data following the selection of an "add" button displayed on the user interface of the client 404 (e.g., as part of the third display layer).

At step 430, the client 404 sends the edit, add, or remove command to the server 402 via the electronic communication network.

At step 432, the server 402 edits, adds, or removes the boundary, recognized text, or ordered step according to the command received from the client 404.

At step 434, the server 402 generates one or both of the second and third layers again to reflect any changes to the boundaries, the recognized text, or the ordered steps.

At step 436, the server 402 sends the display layers to the client 404 via the electronic communication network.

At step 438, the client 404 provides the display layers to the user interface 406 to be displayed.

At step 440, the user interface 406 sends data to the client 404 indicating an interaction with the user interface 406 indicative of the selection of a confirm command. The confirm command may correspond to a confirmation that the user wishes to submit the response data shown on the review/edit screen of the user interface 406 for grading.

At step 442, the client 404 sends the confirm command to the server 402 via the electronic communication network.

At step 444, the server 402 processes the response data (i.e., the recognized text organized into ordered steps) that was generated at step 420 and updated at step 432 using a scoring engine to produce grade data and/or feedback data. In some embodiments, the server 402 may also update a user model stored in a user model database of the server 402, corresponding to the user account (e.g., and the student/ responder) associated with the submitted response data. For example, the user model may be updated to reflect whether the response data was correct, incorrect, or partially correct.

At step 446, the server 402 sends the grade data and/or the feedback data to the client 404 via the electronic communication network.

At step 448, the client 404 provides the grade data and/or the feedback data to the user interface 406 to be displayed.

While the present example provides communication between the server 402 and the client 404, as well as processing steps 420, 422, 432, 434, and 444 that may be performed by a processor of the server, in some alternate embodiments, some or all of the steps 420, 422, 432, 434, and/or 444 may be performed by a processor of the client 404 rather than the processor of the server 402. For example, the client may be capable of performing these functions without needing to communicate with the server 402 in such embodiments.

Figure 5:
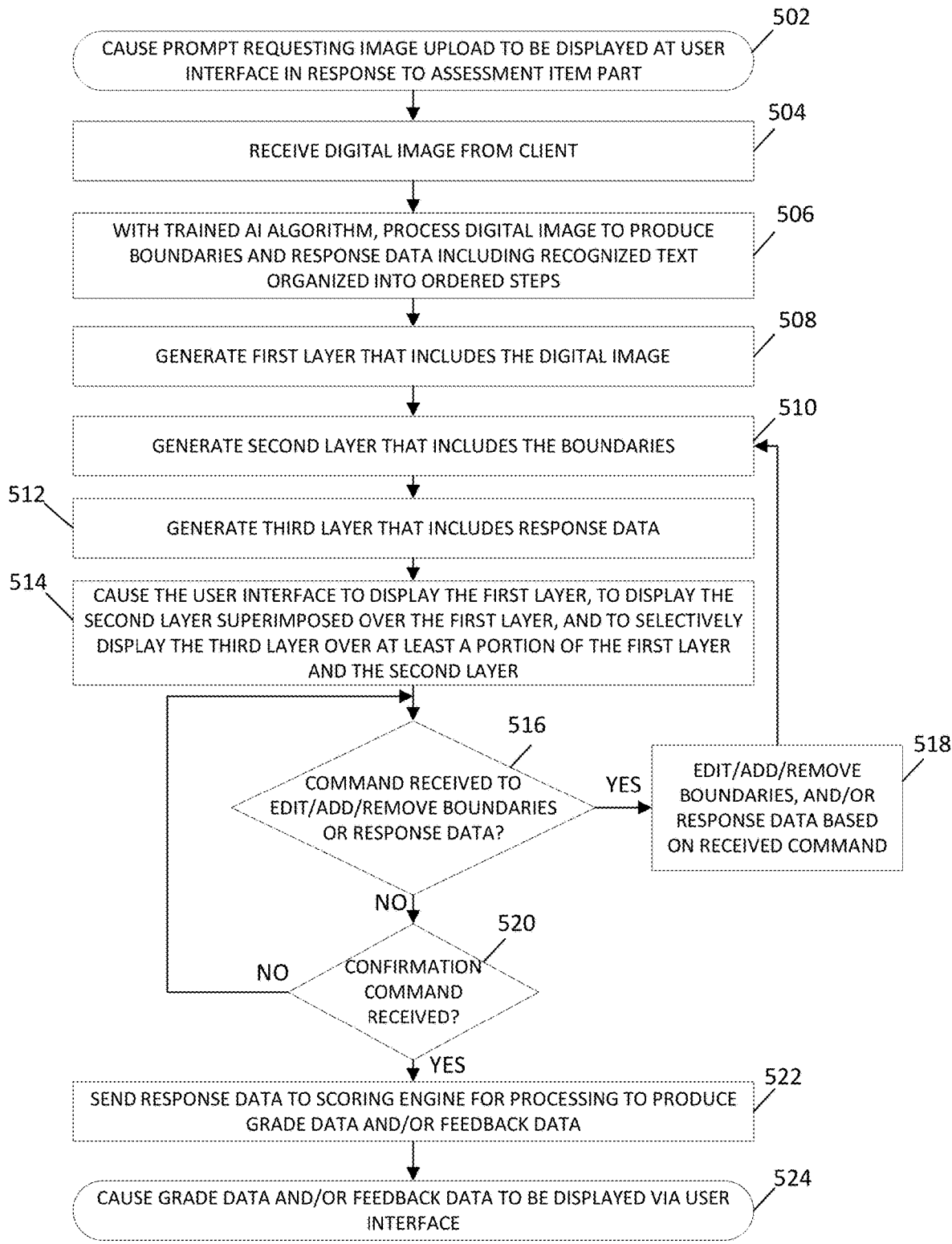
FIG. 5 illustrates a process flow for a method of submitting, processing, editing, and scoring a digital-image-based response to an assessment item part, in accordance with an embodiment.

FIG. 5 shows a method by which a server (e.g., servers 112, server 402, system 200, FIGS. 1, 2, and 4) may communicate with a client (e.g., clients 106, 404, system 200, FIGS. 1, 2, and 4) and perform functions to receive a digital image (e.g., digital image 330 of FIG. 3D), process the digital image using a trained AI algorithm to output boundaries (e.g., boundaries 332, 334, 336, 338 of FIG. 3D) and response data (e.g., response data 316, 318, 320, 322 of FIG. 3C), cause a user interface (e.g., user interface 302 of FIGS. 3A-3I) of the client to display the boundaries and/or the response data, edit the boundaries and response data according to commands received from the client, processing the (potentially edited) response data with a scoring engine to produce grade data (e.g., grades 344, 346, 348 of FIG. 3H) and/or feedback data (e.g., feedback 342 of FIG. 3H), and causing the grade data and/or feedback data to be displayed at the user interface of the client. For example, the method may be performed by executing computer-readable instructions stored on a memory device of the server with a computer processor of the server, the server being in electronic communication with the client via at least one electronic communication network (e.g., the internet; network 120 of FIG. 1). In some embodiments, some or all of the steps of the method of may instead be performed by a computer processor of the client device that executes the corresponding computer-readable instructions.

At step 502, the processor of the server causes a prompt to be displayed at the user interface of the client. The prompt may request that the user capture (e.g., using a camera of the client) or select (e.g., from a memory of the client) a digital image to be uploaded to the server in response to an assessment item part that is part of a digital assessment being administered by the server and client.

At step 504, the processor receives the captured or selected digital image from the client (e.g., via the electronic communication network).

At step 506, the processor executes a trained AI algorithm, which processes the digital image to produce boundaries and response data. The response data may include recognized text extracted from the digital image by the AI algorithm, which may be organized into ordered steps (e.g., with text recognized as being located on two different rows being assigned to two different steps of the ordered steps). The boundaries may have defined locations such that if the boundaries were superimposed over the digital image, a first boundary corresponding to a first step of the ordered steps would bound a first region containing the recognized text present in the digital image corresponding to the first step (e.g., without including other text), and a second boundary corresponding to the second step of the ordered steps would bound a second region containing the text present in the digital image corresponding to the second step (e.g., without including other text).

At step 508, the processor generates a first layer (e.g., a first display layer) that includes the digital image.

At step 510, the processor generates a second layer (e.g., a second display layer) that includes the boundaries.

At step 512, the processor generates a third layer (e.g., a third display layer, sometimes referred to as an overlay layer) that includes the response data.

At step 514, the processor causes the user interface of the client to display the first layer, to display the second layer superimposed over the first layer, and to selectively display the third layer over at least a portion of the first layer and the second layer. For example, the third layer may be displayed over at least a portion of the first and second layers in response to an initial selection of a toggle button (e.g., toggle button 324 of FIG. 3G) displayed on the user interface, and may later be hidden (e.g., retracted) in response to a subsequent selection of the toggle button, such that the first and second layers are visible on the user interface.

At step 516, if the processor receives a command to edit, add, or remove (e.g., change) boundaries or response data from the client (e.g., in response to an interaction with the user interface), the method proceeds to step 518. Otherwise, the method proceeds to step 520. For example, a user may interact with the user interface to draw a new boundary (thereby adding a new step to the response data), to delete an existing boundary (thereby deleting a corresponding step of the response data), to split an existing boundary into two boundaries (thereby splitting a corresponding step of the response data into two steps), to add or remove text of a step of the response data directly, to delete an existing step (thereby deleting the corresponding boundary), to reorder the boundaries (thereby reordering the steps of the response data), and/or to reorder the steps of the response data (thereby reordering the steps of the boundaries).

At step 518, the processor edits, adds, or removes boundaries and/or response data based on the received command.

It should be understood that if a new boundary is drawn as part of the received command, the AI algorithm, or another specialized AI algorithm, may be executed again to attempt to recognize text that may exist in the newly drawn boundary as part of this step. If such text is recognized, it is added to the new step that corresponds to the new boundary.

Once appropriate changes have been made to the boundaries and/or the response data the method returns to step 510, such that the second and third layers are generated again to reflect the changes.

At step 520, if the processor receives a confirmation command from the client (e.g., via a corresponding interaction with the user interface, such as selection of the confirm button 328 of FIG. 3G), the method proceeds to step 522. Otherwise, the method returns to step 516 to check for an edit/add/remove command. For example, the confirmation command may be selected when a user is ready to submit the response data for grading.

At step 522, in response to the confirmation command, the processor sends the response data to a scoring engine for processing. In some embodiments, the scoring engine may be implemented by the processor, while in other embodiments, another processor or group of processors in electronic communication with the processor may implement the scoring engine. The scoring engine may compare the ordered steps of the response data to one or more pre-stored "correct" sets of ordered steps that correspond to the assessment item part being responded to. For example, a given correct set of ordered steps may be stored in a memory of the server, and each step of the correct set of ordered steps may be compared to each step of the response data (e.g., with steps of the same order being compared to one another). If the steps of the correct set of ordered steps match the steps of the response data, then the response data may be considered correct, overall. Even if one or more steps of the response data do not match a given correct set of ordered steps, partial credit may be assigned by the scoring engine for those steps of the response data that do match the corresponding steps of the correct set of ordered steps. In some embodiments, more than one correct set of ordered steps may be compared to the response data (e.g., rather than just a single correct set) as, in some instances, an assessment item part may have more than one correct solution, or there may be more than one correct method of arriving at the correct solution.

Grade data (e.g., grades 344, 346, 348 of FIG. 3H) may be output by the scoring engine, which may include grades for the individual steps as well as an overall grade for the response data. Additionally, feedback data may be generated based on the grade data. For example, predetermined feedback may be provided for each individual step that was incorrect and/or that was missing from the response data. For example, for a given incorrect step of the response data, the predetermined feedback may provide the text of the correct step, and/or providing reasoning explaining why the correct step is considered correct. For example, predetermined feedback (e.g., feedback 342 of FIG. 3H) may also be provided when the response data is correct overall, and may provide confirmation of the overall correctness of the response data and/or positive reinforcement for the user.

At step 524, the processor may cause the grade data and/or the feedback data to be displayed via the user interface of the client (e.g., at an evaluation screen thereof).

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
   a client device comprising:
      an imaging device configured to capture digital images;
      a memory device; and
      an electronic screen configured to display a user interface;
   a server comprising:
      a processor in electronic communication with the client device via an electronic communication network, the processor being configured to execute computer-readable instructions which, when executed, cause the processor to:
         send an assessment item part to the client device to be displayed via the user interface;
         receive a digital image from the client device;
         process the digital image with a trained artificial intelligence algorithm to produce boundaries and response data, the response data comprising ordered steps of recognized text;
         generate a first layer comprising the digital image;
         generate a second layer comprising the boundaries;
         generate a third layer comprising the response data;
         provide the first, second, and third layers to the client device to be displayed via the user interface, such that the second layer is superimposed over the first layer, and the third layer is selectively expandable and retractable over the first and second layers;
         generate updated response data in response to a detected interaction with the user interface;
         update the third layer to include the updated response data;
         receive a confirm command from the client device;
         process the updated response data with a scoring engine to produce grade data; and
         provide the grade data to the client device to be displayed via the user interface.

2. The system of claim 1, wherein the detected interaction comprises selection of a boundary of the boundaries and selection of a delete button displayed within the boundary, and wherein the updated response data omits a step of the ordered steps of recognized text associated with the boundary.

3. The system of claim 1, wherein the detected interaction comprises selection of a step of the ordered steps of recognized text and editing of text of the step to produce an edited step, and wherein the updated response data includes the edited step.

4. The system of claim 1, wherein the detected interaction comprises selection of an add button and provision of user-defined text, and wherein the updated response data includes a new step in the ordered steps, the new step comprising the user-defined text.

5. A computer system comprising:
   a processor in electronic communication with a client device via an electronic communication network, the processor being configured to execute computer-readable instructions which, when executed, cause the processor to:
      receive a digital image from the client device;
      apply a machine learning algorithm to the digital image to extract boundaries and response data from the digital image, the response data comprising recognized text organized into ordered steps, and the boundaries defining regions of the digital image from which the recognized text was extracted;
      receive an command from the client device;
      update the boundaries and response data in response to the command to produce updated boundaries and updated response data;
      receive a confirmation command from the client device;
      process the updated response data with a scoring engine to generate grade data; and
      send the grade data to the client device.

6. The computer system of claim 5, wherein the command is generated in response to selection of a boundary of the boundaries and selection of a delete button displayed within the boundary, and wherein the updated boundaries omit the boundary and the updated response data omits a step of the ordered steps associated with the boundary.

7. The computer system of claim 5, wherein the command is generated in response to selection of a step of the ordered steps and editing of text of the step to produce an edited step, and wherein the updated response data includes the edited step.

8. The computer system of claim 5, wherein the command is generated in response to selection of an add button and provision of user-defined text, and wherein the updated response data includes a new step comprising the user-defined text.

9. The computer system of claim 5, wherein the computer-readable instructions, when executed, cause the processor to:
generate a first layer comprising the digital image;
generate a second layer comprising the boundaries;
generate a third layer comprising the response data; and
provide the first, second, and third layers to the client device to be displayed via a user interface of the client device, such that the second layer is superimposed over the first layer, and the third layer is selectively expandable and retractable over the first and second layers.

10. The computer system of claim 9 wherein the computer-readable instructions, when executed, cause the processor to:
generate an updated second layer comprising the updated boundaries;
generate an updated third layer comprising the updated response data; and
provide the updated second layer and the updated third layer to the client device to be displayed via the user interface, such that the updated second layer is superimposed over the first layer, and the updated third layer is selectively expandable and retractable over the first layer and the updated second layer.

11. The computer system of claim 9, wherein first text of the digital image corresponding to a first step of the ordered steps of the response data is surrounded by a first boundary of the boundaries when the second layer is superimposed over the first layer at the user interface, and wherein second text of the digital image corresponding to a second step of the ordered steps of the response data is surrounded by a second boundary of the boundaries when the second layer is superimposed over the first layer at the user interface.

12. The computer system of claim 5, wherein the computer-readable instructions, when executed, cause the processor to:
administer a digital assessment via the client device by sending an assessment item part of the digital assessment to the client device.

13. A method comprising:
receiving, by a processor, a digital image;
applying, by the processor, a machine learning algorithm to the digital image to extract boundaries and response data, the response data comprising recognized text organized into ordered steps, the boundaries defining regions of the digital image from which the recognized text was extracted;
receiving, by the processor, a command via a user interface;
updating, by the processor, the boundaries and response data in response to the command to produce updated boundaries and updated response data;
receiving, by the processor, a confirmation via the user interface;
processing, by the processor, the updated response data with a scoring engine to generate grade data in response to the confirmation; and
causing, by the processor, the grade data to be displayed via the user interface.

14. The method of claim 13, wherein the command is generated in response to selection of a boundary of the boundaries and selection of a delete button displayed within the boundary via the user interface, and wherein the updated boundaries omit the boundary and the updated response data omits a step of the ordered steps associated with the boundary.

15. The method of claim 13, wherein the command is generated in response to selection of a step of the ordered steps and editing of text of the step to produce an edited step via the user interface, and wherein the updated response data includes the edited step.

16. The method of claim 13, wherein the command is generated in response to selection of an add button and provision of user-defined text via the user interface, and wherein the updated response data includes a new step comprising the user-defined text.

17. The method of claim 13, further comprising:
generating, by the processor, a first layer comprising the digital image;
generating, by the processor, a second layer comprising the boundaries;
generating, by the processor, a third layer comprising the response data; and
providing, by the processor, the first, second, and third layers to be displayed via the user interface, such that the second layer is superimposed over the first layer, and the third layer is selectively expandable and retractable over the first and second layers.

18. The method of claim 17, further comprising:
generating, by the processor, an updated second layer comprising the updated boundaries;
generating, by the processor, an updated third layer comprising the updated response data; and
providing, by the processor, the updated second layer and the updated third layer to be displayed via the user interface, such that the updated second layer is superimposed over the first layer, and the updated third layer is selectively expandable and retractable over the first layer and the updated second layer.

19. The method of claim 17, wherein first text of the digital image corresponding to a first step of the ordered steps of the response data is surrounded by a first boundary of the boundaries when the second layer is superimposed over the first layer at the user interface, and wherein second text of the digital image corresponding to a second step of the ordered steps of the response data is surrounded by a second boundary of the boundaries when the second layer is superimposed over the first layer at the user interface.

20. The method of claim 13, further comprising:
administering, by the processor, a digital assessment via the user interface at least in part by causing an assessment item part of the digital assessment to be displayed via the user interface.

* * * * *